UNITED STATES PATENT OFFICE.

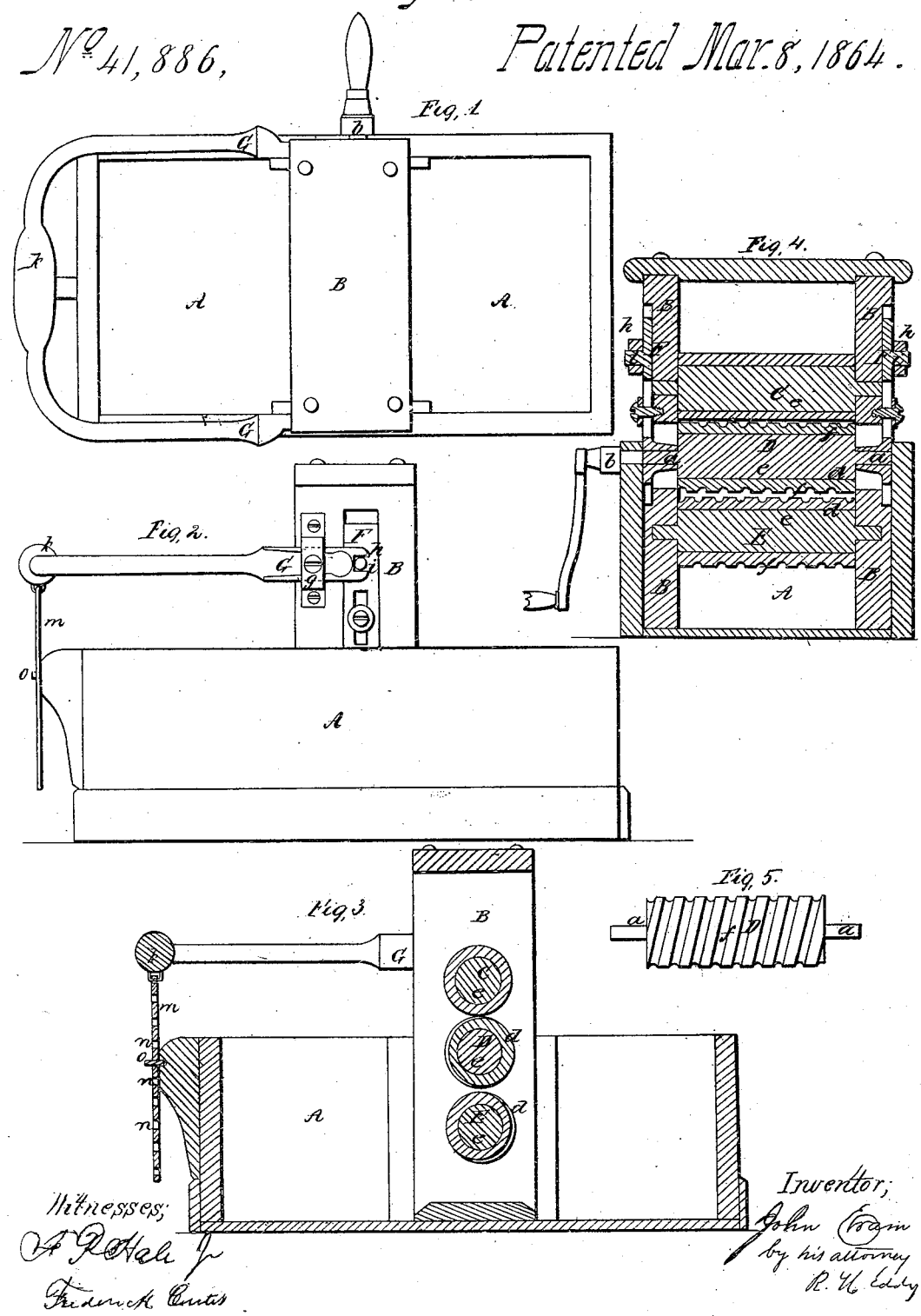

JOHN CRAM, OF BOSTON, MASSACHUSETTS, ASSIGNOR TO HIMSELF AND JOHN S. CRAM, OF SAME PLACE.

IMPROVEMENT IN WASHING AND WRINGING MACHINES.

Specification forming part of Letters Patent No. 41,886, dated March 8, 1864.

*To all whom it may concern:*

Be it known that I, JOHN CRAM, a resident of Boston, in the county of Suffolk and State of Massachusetts, have invented an Improved Machine for Washing and Wringing Clothes; and I do hereby declare the same to be fully described in the following specification, and represented in the accompanying drawings, of which—

Figure 1 is a top view, Fig. 2 a side elevation, Fig. 3 a longitudinal section, and Fig. 4 a transverse section, of it. Fig. 5 is a side view of one of its washing-rollers.

The machine in question may be said to be an improvement on that invented by me and described in Letters Patent dated September 15, 1863, as in my present machine, as well as in that so patented, I make use of a combination and arrangement of two washing-rollers and a squeezing-roller.

The nature of my present invention consists in an improved mode of making the elastic covering of each of the washing-rollers, and also in the combination of a single yoke-lever and certain holding devices thereof, with rollers operating together, substantially as specified.

In the said drawings, A denotes an elongated trough or tub, having a frame, B, arranged within and above it, as represented in Figs. 1, 2, 3, and 4. Within this frame three elastic rollers, C D E, are disposed with their axes parallel and horizontal, and in one vertical plane.

The upper and lower rollers, C and E, are made stationary in position, except in being capable of being revolved on their respective axes. The middle roller, however, is not directly supported by the frame B, but by two sliders, F F, arranged in the posts of the said frame, and so as to be capable of sliding vertically therein. The shaft *a* of the middle roller has its bearings in these sliders, and is provided with a crank, *b*, by which the roller may be put in revolution.

Each of the washing-rollers D E is constructed of a tube or sleeve, *d*, of vulcanized india-rubber, or any equivalent therefor, slipped on and connected to a cylinder or body-block, *c*, and is grooved helically on its outer surface from end to end, as shown at *f*. This mode of making the roller I consider preferable to that described in my said patent, which consisted in forming the elastic part of the roller with two strips of rubber wound on a helically-grooved inelastic body.

By making the elastic covering in one piece, sleeve, or tube of rubber, grooved helically externally, there are no joints or places in which lint or dirt can enter and collect, as is the case when the covering is formed of separate strips of rubber wound together, as set forth in my said patent.

A yoke-lever, G, spans the frame B horizontally, and works on fulcra extending from such frame, one of such fulcra being shown at *g*. The extremities of this lever are notched to receive pins or studs projecting from the sliders F F, one of the notches, *h*, and its pin or stud *i*, being shown in Fig. 2.

By taking hold of the yoke-lever at its middle, or handle part, *k*, the lever may be moved so as to cause the intermediate roller, D, to move toward either of the rollers C or E. From the said part *k* of the yoke-lever a bar, *m*, depends, and is provided with a series of holes, *n n n*, made through it for the purpose of enabling the bar to be hitched upon a stud or pin, *o*, projecting from the tub. The perforated bar *m* and the pin *o* are the holding devices of the yoke-lever, as they serve to retain it in its proper positions in order to enable the roller D to be used with either of the other rollers—that is, either for washing or wringing (that is squeezing) clothes—as circumstances may require.

The yoke-lever should be made of walnut-wood or some other proper elastic material, such as will enable the lever to act as a spring to allow the roller D to give way or move more or less under pressure against it, induced by any inequality in the thickness of a mass of cloth while being run between two of the rollers.

The yoke-lever, applied to the middle roller as described, dispenses with much mechanism which becomes necessary when the rollers are operated in manner as described in my said patent.

In order to wash an article of clothing while the tub A may be supplied with water or soap-suds, the said article is to be run between the two washing-rollers D E, the upper of which in the meantime having a quick reciprocating rotary motion imparted to it. As the two rollers will be moved in opposite directions, their projecting parts or coils will co-operate so as to effect the cleansing or washing of the clothes.

By running the clothes between the rollers C and D the water may be wrung or expressed from them.

I claim—

1. The improved mode of making the elastic covering of each of the elastic washing-rollers—viz., of a solid tube of vulcanized rubber or other equivalent material, grooved helically from end to end, as described.

2. The combination of the single yoke-lever and the holding devices thereof with rollers operating together substantially as described.

JOHN CRAM.

Witnesses:
R. H. EDDY,
F. P. HALE, Jr.